(12) United States Patent
Keeney

(10) Patent No.: US 8,083,436 B2
(45) Date of Patent: *****Dec. 27, 2011

(54) METHODS AND SYSTEMS TO MAINTAIN ACCESSIBILITY AND INTEGRITY OF EQUIPMENT CONTAINED IN UNDERGROUND HOUSINGS

(76) Inventor: George W. Keeney, Kenmore, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/837,792

(22) Filed: Jul. 16, 2010

(65) Prior Publication Data

US 2011/0070026 A1  Mar. 24, 2011

Related U.S. Application Data

(63) Continuation of application No. 11/232,386, filed on Sep. 20, 2005, now Pat. No. 7,780,374.

(51) Int. Cl.
*G01F 15/18* (2006.01)
(52) U.S. Cl. .............. 405/38; 405/36; 137/366; 137/363
(58) Field of Classification Search ............. 405/36, 405/38, 40, 41, 52, 53; 137/363, 364, 366, 137/371
See application file for complete search history.

(56) References Cited

U.S. PATENT DOCUMENTS

| | | | |
|---|---|---|---|
| 3,542,059 A * | 11/1970 | Blanchard et al. ............. 137/388 |
| 4,669,305 A | 6/1987 | Rivero-Olmedo ............... 73/201 |
| 4,809,548 A | 3/1989 | Rivero-Olmedo ............... 73/201 |
| 5,823,577 A | 10/1998 | Johnston ......................... 285/30 |
| 6,899,240 B2 | 5/2005 | Dang ............................. 220/3.8 |
| 6,932,099 B2 | 8/2005 | Mahaney ................... 137/15.08 |
| 7,004,677 B1 | 2/2006 | Ericksen ......................... 405/51 |
| 7,780,374 B2 * | 8/2010 | Keeney ............................ 405/38 |

OTHER PUBLICATIONS

Armor Access Boxes—Turf Irrigation Boxes, Underhill International, http://www.ulcorp.net/ArmTurJimbo.htm, Sep. 15, 2004.

* cited by examiner

*Primary Examiner* — Frederick L Lagman
(74) *Attorney, Agent, or Firm* — K&L Gates, LLP

(57) ABSTRACT

Disclosed herein are methods, devices and systems to maintain the accessibility and integrity of equipment contained in underground housings. The methods, devices and systems and methods of the present invention maintain the accessibility and integrity of equipment contained in underground housings by providing at least one barrier that prevents burrowing animals from off-loading displaced ground dirt or other debris into the space created by the underground housing.

16 Claims, 3 Drawing Sheets

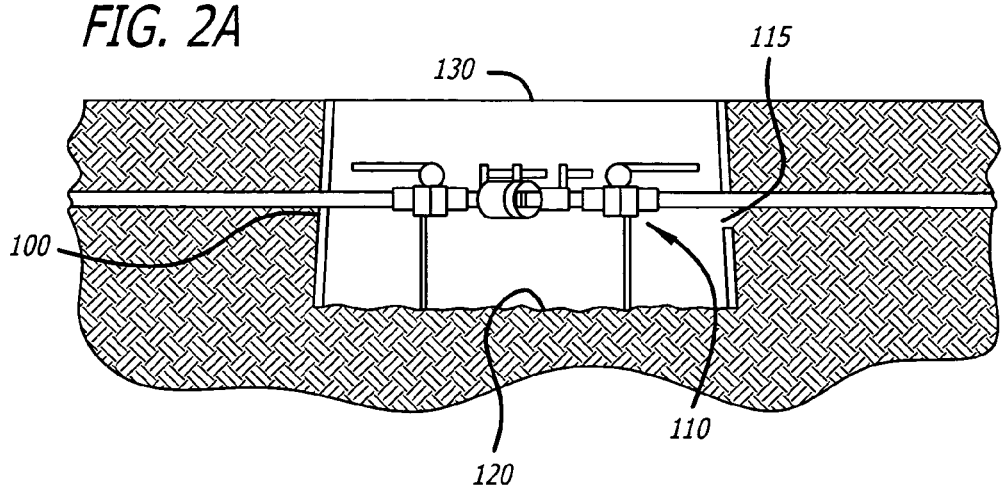
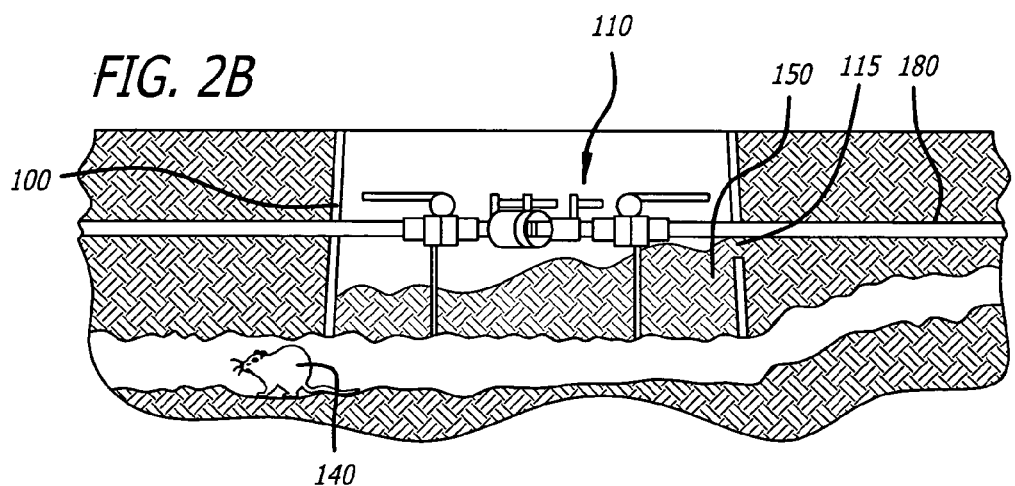
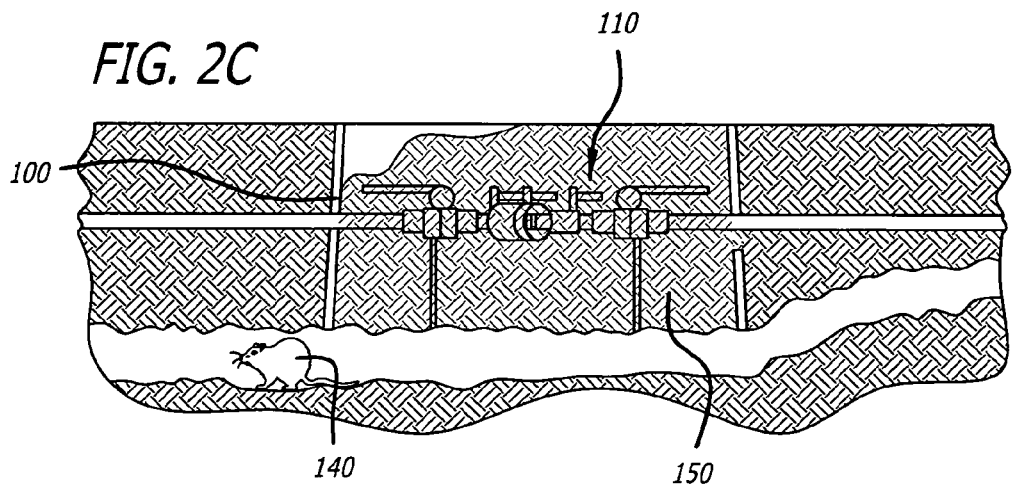

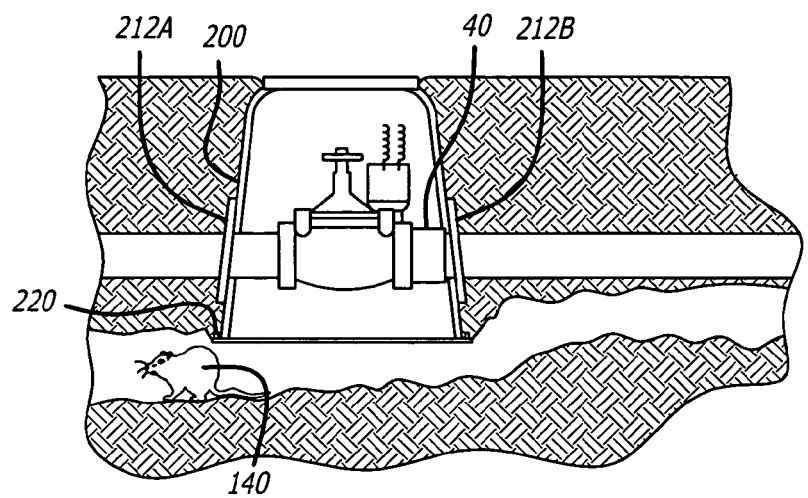
*FIG. 3A*
*FIG. 3B*
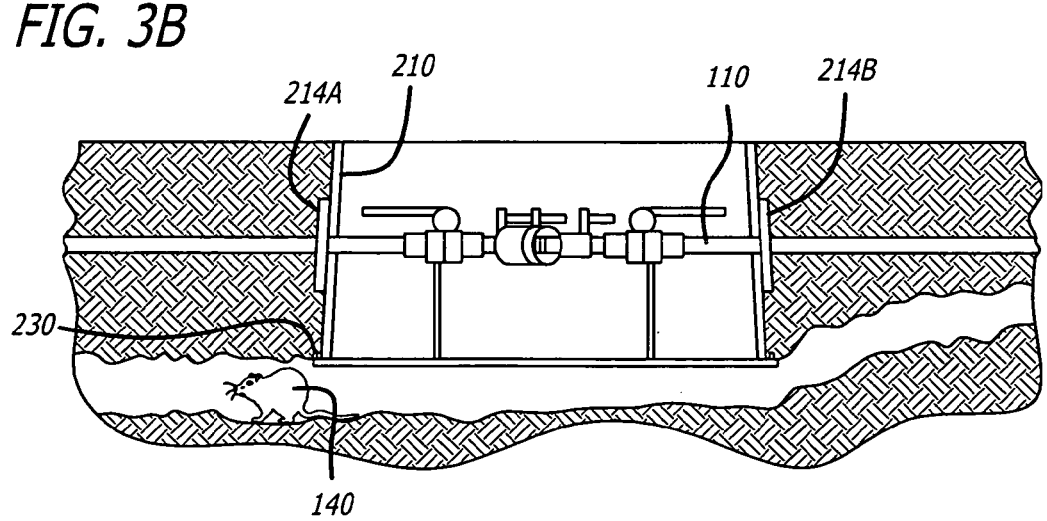

METHODS AND SYSTEMS TO MAINTAIN ACCESSIBILITY AND INTEGRITY OF EQUIPMENT CONTAINED IN UNDERGROUND HOUSINGS

CROSS-REFERENCE TO RELATED APPLICATION

This application is a continuation of U.S. application Ser. No. 11/232,386, filed Sep. 20, 2005, issued as U.S. Pat. No. 7,780,374, which application is incorporated by reference in its entirety herein.

FIELD OF THE INVENTION

The present invention provides methods, devices and systems to maintain the accessibility and integrity of equipment contained in underground housings. The methods, devices and systems of the present invention maintain the accessibility and integrity of equipment contained in underground housings by preventing burrowing animals from infiltrating the spaces found within these housings.

BACKGROUND OF THE INVENTION

When irrigation systems were first installed in the 1930s, the systems were activated manually and the valves controlling the systems were mounted on the surface of the ground if not above the ground entirely. In the 1950s, when irrigation systems adopted automatic activation, the automatic valves associated with these systems were generally buried, often with no marking as to their underground location. It soon became apparent, however, that knowledge of the underground valves' locations was necessary for routine service and maintenance. Further, even when underground valves were located, a wide area needed to be dug around them for accessibility and servicing.

Responding to these problems associated with buried valves, manufacturers and installers of irrigation systems began to mark the placement of underground valves and also to place the valves inside protective housings (i.e. "underground housings" such as boxes, pits or vaults). These underground housings were intended to enhance the accessibility of and to protect the underground valves and equipment.

As underground housings are presently constructed, these underground housings do not include a bottom surface. Instead, the ground provides the sixth "bottom-side" of the housing (see FIGS. 1A and 2A).

The described underground housings provide a number of advantages in allowing the placement of underground equipment. Moles, shrews, gophers and a number of other burrowing animals, however, can cause serious problems that detract from the benefits these underground housings were designed to provide.

When burrowing animals burrow in the vicinity of an underground housing, they often off-load displaced ground dirt or other debris (including, without limitation, rocks, gravel, etc.) into the space found within an underground housing. This off-loading is especially likely because burrowing animals often follow the path of an underground pipe or cable that leads to the location of an underground housing containing equipment related to the particular pipe or cable. At the location of the underground housing, the animals generally off-load ground dirt or other debris displaced by the burrowing because the empty air space provided by the underground housing provides a convenient place to do so.

The off-loading of displaced ground dirt or other debris by burrowing animals into underground housings causes numerous problems. First, the burrowing pushes large amounts of displaced ground dirt or other debris into the underground housing. This displaced ground dirt or other debris often covers the equipment within the underground housing thus reducing the accessibility of the equipment. Further, once displaced ground dirt or other debris has entered the space within an underground housing, roots from trees and shrubs soon follow. These roots entwine with themselves and the equipment within the underground housing, further limiting the accessibility of the equipment within the underground housing. Thus, once a burrowing animal has infiltrated an underground housing, a technician needing to access the equipment must not only dig out the off-loaded ground dirt or other debris but also must contend with roots tangled and entwined around valves, wires and other sensitive devices. This problem requires technicians to spend a great deal of time digging to the equipment found within an underground housing. This time reduces the productivity of these technicians and ultimately adds costs to consumers.

The displaced ground dirt or other debris and resulting roots found within underground housings caused by burrowing animals also can damage the equipment found within these underground housings. For example, many underground installations are designed or required to have open space around them. When displaced ground dirt or other debris and roots that would otherwise not exist in the housing reduce or eliminate the open space, excessive corrosion and premature failure often result.

Finally, most if not all states and water districts now require that irrigation systems include backflow assemblies to prevent the contamination of drinking water supplies from weed killers, fertilizers and animal waste (see, without limitation, Washington state code 246-290-490 and Utah state code 13.12). To prevent contamination of water supplies, many states also require that these underground backflow assemblies have at least a 12 inch clearance maintained below the assembly. If a burrowing animal infiltrates an underground space housing a backflow assembly, however, and displaced ground dirt or other debris and roots fill this space, the 12 inch clearance is not maintained and, in some cases, the backflow assembly can become completely buried. Both situations result in the violation of various health codes and poses a public health hazard.

Thus, while underground housings are intended to maintain the accessibility and integrity of the equipment contained therein, burrowing animals often reduce the effectiveness of these underground housings. Burrowing animals reduce the effectiveness of underground housings by off-loading displaced ground dirt and other debris in at least two ways: (1) up through the bottom of these underground housings, and/or (2) through small gaps that can be found around pipes or other cables entering or exiting the underground housing.

SUMMARY OF THE INVENTION

The present invention addresses the foregoing problems by providing methods, devices and systems that prevent burrowing animals from off-loading displaced ground dirt or other debris into underground housings. Burrowing animals are prevented from off-loading displaced ground dirt or other debris into underground housings by providing an effective barrier under the housings and/or around pipes or other cables entering or exiting the underground housings. The methods, devices and systems of the present invention include devices designed to fit under various underground housings (including, without limitation, different sized pits, boxes and vaults) and also designed to fit around variously-sized pipes and cables that enter and exit underground housings. These barriers seal off access to moles, shrews, gophers and other burrowing animals that tend to follow pipes, wires, cables and other underground installations and deposit their burrowed out ground dirt or other debris into these spaces.

Specifically, one embodiment of the present invention includes a method comprising maintaining the integrity of spaces within an underground housing that contains equipment by providing at least one barrier which prevents ground dirt or other debris displaced by a burrowing animal from entering the underground housing.

In one embodiment of the methods of the present invention, the at least one barrier is provided at the bottom of the underground housing. In another embodiment of the methods of the present invention, the at least one barrier is provided around a point where a pipe or a cable enters or exits the underground housing.

In another embodiment of the methods of the present invention, the underground housing contains equipment relating to one or more of the group selected from an irrigation system, a backflow assembly, a water meter, a manual shut off for a natural gas line, a manual shut off for a drinking fountain, a manual shut off for a sprinkler system, a manual shut off for a hose faucet, a cable company splice, a broad band splice, and a low voltage lighting splice.

In another embodiment of the methods of the present invention, the burrowing animal is one or more of the group selected from a mole, a shrew, a gopher, a prairie dog, a fox, a rabbit, a muskrat, a weasel, a skunk, a badger, a platypus, a bilbie, a meerkat, an owl, a frog, a spider, a rat, a mouse and an earthworm.

In another embodiment of the methods of the present invention, the at least one barrier is impermeable to ground dirt or other debris. In another embodiment of the methods of the present invention, the at least one barrier is also impermeable to water. In another embodiment of the methods of the present invention, the at least one barrier also prevents roots from growing into the space within an underground housing.

Embodiments of the present invention also include devices. In one embodiment of the devices of the present invention, the device comprises a barrier for maintaining the integrity of space within an underground housing that contains equipment wherein the barrier prevents ground dirt or other debris displaced by a burrowing animal from entering the underground housing.

In another embodiment of the devices of the present invention, the underground housing contains equipment relating to one or more of the group selected from an irrigation system, a backflow assembly, a water meter, a manual shut off for a natural gas line, a manual shut off for a drinking fountain, a manual shut off for a sprinkler system, a manual shut off for a hose faucet, a cable company splice, a broad band splice, and a low voltage lighting splice.

In another embodiment of the devices of the present invention, the burrowing animal is one or more of the group selected from a mole, a shrew, a gopher, a prairie dog, a fox, a rabbit, a muskrat, a weasel, a skunk, a badger, a platypus, a bilbie, a meerkat, an owl, a frog, a spider, a rat, a mouse and an earthworm.

In another embodiment of the devices of the present invention the barrier is impermeable to ground dirt or other debris. In another embodiment of the devices of the present invention, the barrier is also impermeable to water. In another embodiment of the devices of the present invention, the barrier further prevents roots from growing into the space within an underground housing.

The present invention also includes systems. In one embodiment of the systems of the present invention, the system comprises a space within an underground housing that contains equipment, and a barrier located at the deepest point of the underground space that houses the equipment wherein the barrier prevents ground dirt or other debris displaced by a burrowing animal from entering the space within the underground housing.

In another embodiment of the systems of the present invention, the underground housing contains equipment relating to one or more of the group selected from an irrigation system, a backflow assembly, a water meter, a manual shut off for a natural gas line, a manual shut off for a drinking fountain, a manual shut off for a sprinkler system, a manual shut off for a hose faucet, a cable company splice, a broad band splice, and a low voltage lighting splice.

In another embodiment of the systems of the present invention, the burrowing animal is one or more of the group selected from a mole, a shrew, a gopher, a prairie dog, a fox, a rabbit, a muskrat, a weasel, a skunk, a badger, a platypus, a bilbie, a meerkat, an owl, a frog, a spider, a rat, a mouse and an earthworm.

In another embodiment of the systems of the present invention, the barrier is impermeable to ground dirt or other debris. In another embodiment of the systems of the present invention, the barrier is also impermeable to water. In another embodiment of the systems of the present invention, the barrier further prevents roots from growing into the space within an underground housing.

BRIEF DESCRIPTION OF FIGURES

FIG. 2A shows a backflow assembly within an underground housing before a burrowing animals has off-loaded displaced ground dirt or other debris.

FIG. 2B shows a backflow assembly within an underground housing after a burrowing animal has displaced ground dirt or other debris into the underground housing.

FIG. 2C shows a backflow assembly within an underground housing after a burrowing animal has displaced additional ground dirt or other debris into the underground housing.

FIG. 3A shows a barrier of the present invention preventing a burrowing animal from off-loading displaced ground dirt or other debris into an underground housing containing a valve assembly.

FIG. 3B shows a barrier of the present invention preventing a burrowing animal from off-loading displaced ground dirt or other debris into an underground housing containing a backflow assembly.

DETAILED DESCRIPTION OF FIGURES

Figure 1A:
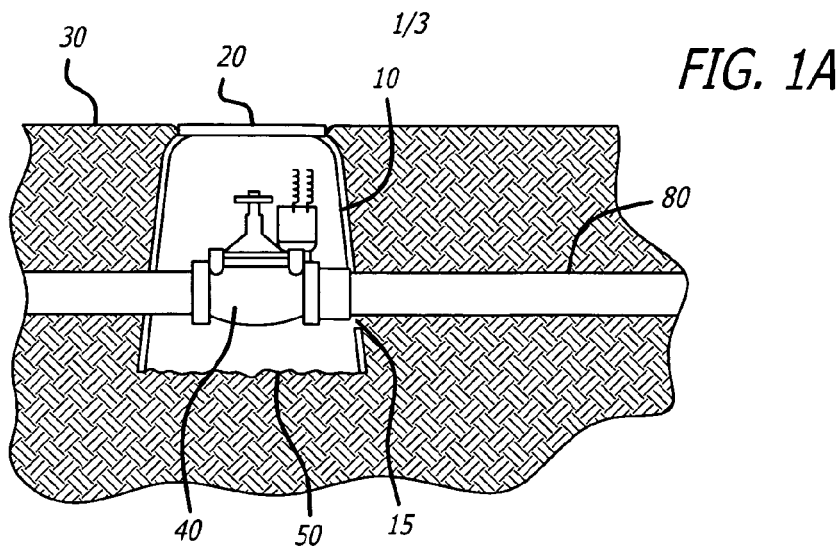
FIG. 1A shows an underground valve box before a burrowing animal has off-loaded displaced ground dirt or other debris.

FIG. 1A depicts an underground housing, in this example, a valve box 10. The underground valve box 10 includes a cover 20 that is flush with the surface of the ground 30. The underground valve box 10 houses an automatic control valve 40. The underground valve box 10 does not include a manufactured bottom, the "bottom" of the underground valve box 10 constituting underground dirt 50. In this depicted example, a small gap 15 also exists where a pipe 80 enters the valve box 10. FIG. 1A depicts the underground valve box 10 before a burrowing animals has off-loaded displaced ground dirt or other debris. Thus, in this FIG. 1A, the automatic control valve 40 is still accessible and has not been negatively affected by burrowing animals.

Figure 1B:
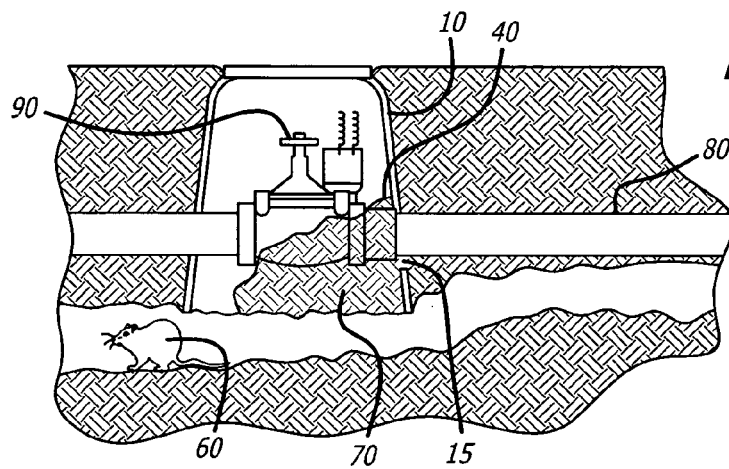
FIG. 1B shows an underground valve box after a burrowing animal has displaced ground dirt or other debris into the underground housing.

FIG. 1B shows the same underground valve box 10 depicted in FIG. 1A but after a burrowing animal 60 has off-loaded displaced dirt or other debris into the underground space created by the valve box 10. Note that burrowing animals 60 are likely to arrive at the location of the underground valve box 10 because such animals 60 tend to burrow along the paths of underground pipes (perhaps because soil along such pipes is looser than native soil), such as the underground pipe 80 depicted in FIG. 1B. In this FIG. 1B, displaced ground dirt and other debris has been off-loaded both through the gap 15 where the pipe 80 enters the valve box 10 and through the "bottom" of the valve box 10. While some displaced dirt or other debris 70 has been off-loaded in FIG. 1B, the valve control piece 90 itself is still accessible to service technicians. The off-loaded dirt and other debris is still problematic, however, as its close proximity to the equipment (automatic control valve 40) housed within the underground valve box 10 can lead to premature corrosion and failure of the equipment.

Figure 1C:
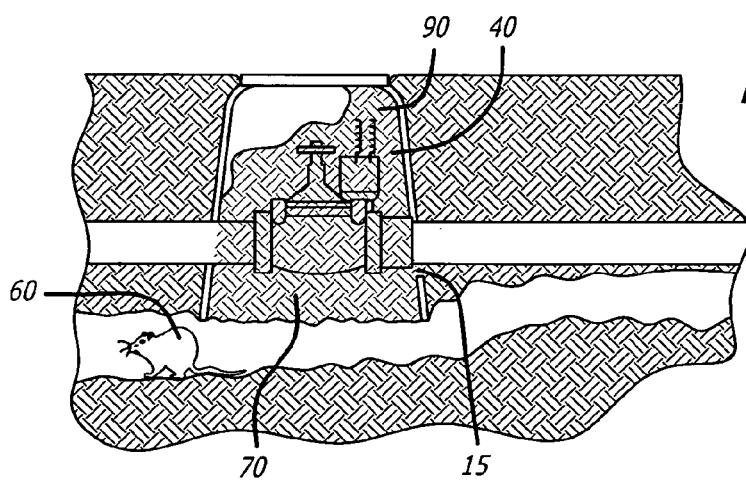
FIG. 1C shows an underground valve box after a burrowing animal has displaced additional ground dirt or other debris into the underground housing.

FIG. 1C shows the underground valve box 10 depicted in FIGS. 1A and 1B after burrowing animals 60 have off-loaded a sufficient amount of displaced ground dirt or other debris 70 to fully cover the automatic control valve 40 and the specific valve control piece 90. In this situation, in order to service the automatic control valve 40, the technician must dig down at least to the specific valve control piece 90 and perhaps further depending on the particular service required. Further, because the entire assembly 40 and 90 is covered by displaced ground dirt or other debris, premature corrosion and failure of the equipment is even more likely.

FIGS. 2A-2C depict the same process of a burrowing animal off-loading displaced ground dirt or other debris into the space created by an underground housing. In FIGS. 2A-2C, however, the underground housing 100 contains a backflow assembly 110 that requires a minimum of a 12 inch clearance between the backflow assembly 110 and the ground dirt 120 that creates the "bottom side" of the underground housing. This 12 inch clearance between the backflow assembly 110 and the ground dirt 120 is required to prevent contamination of drinking water supplies from weed killers, fertilizers and animal waste and to comply with various state laws and regulations (see, without limitation, Washington state code 246-290-490 and Utah state code 13.12). In FIG. 2A, a burrowing animal has not yet off-loaded displaced ground dirt or other debris into the space created by the underground housing 100 and the backflow assembly maintains its 12 inch clearance requirement. Further, the backflow assembly 110 is easily accessible to a service technician that removes the underground housing's 100 top cover 130.

FIG. 2B shows the same underground housing 100 and backflow assembly 110 as that depicted in FIG. 2A. In FIG. 2B, however, a burrowing animal 140 has off-loaded displaced ground dirt or other debris 150 into the space created by the underground housing 100 both through a gap 115 located where a pipe 180 enters the underground housing 100 and at the bottom of the underground housing 100. Once this displaced ground dirt or other debris 150 has been off-loaded into an underground housing 100 containing a backflow assembly 110, a risk of contamination of drinking water occurs due to the failure to maintain the required 12 inch clearance.

In FIG. 2C, burrowing animals 140 have continued to off-load displaced ground dirt or other debris into the underground housing 100 until the backflow assembly 110 has been completely covered. In this situation, there is a risk of contaminated drinking water, and a service technician must remove the off-loaded displaced ground dirt or other debris from the underground housing 100 before accessing the backflow assembly 110 to perform required maintenance or annual tests of the equipment. Further, the backflow assembly 110 is at risk of accelerated corrosion and damage due to the dirt and moisture in its immediate vicinity.

FIGS. 3A and 3B show underground housings 200 and 210 containing an automatic control valve 40 (FIG. 3A) and a backflow assembly 110 (FIG. 3B) respectively. The underground housings 200 and 210 depicted in FIGS. 3A and 3B include barrier devices 220 and 230 that prevent burrowing animals 140 from off-loading displaced ground dirt or other debris into the underground housings through the bottom sides of these housings. Barriers 212A and 212B and 214A and 214B also prevent burrowing animals from off-loading displaced ground dirt or other debris into the underground housings through gaps that might exist at areas where pipes or other cables enter or exit an underground housing. In one embodiment, these barriers 212A and 212B and 214A and 214B are approximate rings through which pipes or cables can pass. Importantly, these barriers 212A and 212B and 214A and 214B are not required in all embodiments of the present invention, but can be used within the discretion of a technician installing equipment within an underground housing when the technician determines that gaps are present where pipes or other cables enter the underground housing.

The prevention of off-loading by the barriers of the present invention maintains the integrity of spaces within underground housings by maintaining accessibility of the equipment housed therein by service technicians. This prevention of off-loading also prevents premature corrosion and damage to the equipment by off-loaded dirt, debris and resulting root infiltration and, in the case of backflow assemblies, maintains the required 12 inch clearance necessary to prevent drinking water contamination by weed killers, fertilizers and animal waste.

Barriers of the present invention that prevent ground dirt and other debris from off-loaded into an underground housing through the non-existent "bottom" of an underground housing can be manufactured in a variety of shapes and sizes to protect a variety of underground housings, some of which are commercially available. In one embodiment of the present invention, the bottom barrier of the present invention is designed to maintain the integrity of a 6 inch underground pit. In this embodiment, the barrier can have an approximately circular shape with an approximately 9 inch diameter and can extend approximately ¼ inch beyond the base of the pit. In another embodiment of the present invention, the barrier of the present invention is designed to maintain the integrity of a 10 inch underground pit. In this embodiment, the barrier can have an approximately circular shape with an approximately 14 inch diameter and can extend approximately ½ inch beyond the base of the pit. In other embodiments of the present invention, the barrier can be designed to maintain the integrity of a "standard box," or a "jumbo box" available from manufacturers such as, without limitation, Armor™ Access Boxes (Sheboygan, Wis.) In these embodiment, the barrier is approximately rectangular with a variety of dimensions.

Standard dimensions can include widths of approximately 13 inches to approximately 20 inches and lengths of approximately 18 inches to approximately 42 inches, however, the invention is not limited to any of the provided and exemplary dimensions.

The barriers of the present invention that inhibit or prevent off-loading at pipe or cable entry or exit points can consist of barriers with an approximately circular space in the middle through which the pipes or cables entering or exiting the underground housing can pass. If these barriers are constructed of a rigid material, the barrier can include a hinge that allows it to open and close around the pipes or cables entering or exiting the underground housing. When the two points of the barrier farthest from the hinge come together as the device is closed around the pipes or cables, the two points can attach to each other or can overlap. Alternatively, this barrier type of the present invention can be constructed of two or more pieces that clasp or link together around the circumference of the pipe or cable entering or exiting an underground housing. Still further, these barriers could consist of an approximate ring constructed of, without limitation, a thick rubber. This ring could be broken at one point with the portions near the break point constructed to substantially overlap over the break point. Alternative, this ring could have more than one break point, so long as all portions near break points are constructed to substantially overlap over the break points. The overlaps created over break points will be sufficient so that burrowing animals cannot force dirt through a break point into the space of an underground housing. These examples of the barriers of the present invention are provided by way of example, and are not intended to limit the scope of the present invention.

The barrier devices of the present invention can be made with any suitable material that is able to prevent burrowing animals from off-loading displaced ground dirt or other debris into the spaces created by underground housings. In one embodiment, the barrier devices of the present invention are manufactured from a plastic. In another embodiment, the barrier devices of the present invention are manufactured from a polyurethane, such as, without limitation a thermoplastic polyurethane. In another embodiment, the barrier devices of the present invention are manufactured from a standard plastic stock. In another embodiment, the barrier devices of the present invention are manufactured from a vinyl plastisol. In another embodiment, the barrier devices of the present invention are manufactured from thermoplastic elastomers. In another embodiment, the barrier devices of the present invention are manufactured from natural or synthetic rubber compounds. In another embodiment, the barrier devices of the present invention are manufactured from a metal. In accordance with the previous non-limiting manufacturing materials, the barrier devices of the present invention could be manufactured using an injection molding process, a die-casting process, a wax casting process, or any other appropriate manufacturing process.

Finally, the barrier devices of the present invention can be constructed in a wide variety of sizes, colors and style variations. Regardless of size, color, or style variation, the barrier devices of the present invention may be readily adapted to fit a wide variety of standard commercially-available underground housings.

Because numerous modifications and changes will readily occur to those skilled in the art, the foregoing is not intended to limit the invention to the to the particular embodiments, materials, and examples described herein. Accordingly, all suitable modifications and equivalents are included as falling within the scope of the invention. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "a barrier device" or "a burrowing animal" is a reference to one or more barrier devices or burrowing animals and includes equivalents thereof known to those skilled in the art and so forth. Unless defined otherwise, all technical terms used herein have the same meanings as commonly understood by one of ordinary skill in the art to which this invention belongs.

What is claimed is:

1. A method comprising:
maintaining the integrity of space within an underground housing that contains equipment and lacks a bottom by providing one barrier which prevents ground dirt or other debris displaced by an animal from reducing the effectiveness of said underground housing wherein said barrier effectively fits a variety of underground housings with different shapes and/or sizes without modification and wherein said underground housing contains equipment relating to an irrigation system, a backflow assembly, a manual shut off for a natural gas line, a manual shut off for a drinking fountain, a manual shut off for a sprinkler system, a manual shut off for a hose faucet, a cable company splice, a broad band splice, or a low voltage lighting splice.

2. The method according to claim 1, wherein said one barrier is provided at the bottom of said underground housing.

3. The method according to claim 1, wherein said one barrier is provided around a point where a pipe or a cable enters or exits said underground housing.

4. The method according to claim 1, wherein said one barrier is provided at the bottom of said underground housing and around one or more points where a pipe or cable enters or exits said underground housing.

5. The method according to claim 1, wherein said animal is one or more of a mole, a shrew, a gopher, a prairie dog, a fox, a rabbit, a muskrat, a weasel, a skunk, a badger, a platypus, a bilbie, a meerkat, an owl, a frog, a spider, a rat, a mouse or an earthworm.

6. The method according to claim 1, wherein said one barrier is impermeable to said ground dirt or other debris.

7. The method according to claim 1, wherein said one barrier is impermeable to water.

8. The method according to claim 1, wherein said one barrier further prevents roots from reducing the effectiveness of said underground housing.

9. A system comprising an underground housing that lacks a bottom and contains equipment and one barrier which prevents ground dirt or other debris displaced by an animal from reducing the effectiveness of said underground housing wherein said barrier effectively fits a variety of underground housings with different shapes and/or sizes without modification and wherein said underground housing contains equipment relating to one or more of the group selected from an irrigation system, a backflow assembly, a manual shut off for a natural gas line, a manual shut off for a drinking fountain, a manual shut off for a sprinkler system, a manual shut off for a hose faucet, a cable company splice, a broad band splice, and a low voltage lighting splice.

10. The system according to claim 9, wherein said one barrier is provided at the bottom of said underground housing.

11. The system according to claim 9, wherein said one barrier is provided around a point where a pipe or a cable enters or exits said underground housing.

12. The system according to claim 9, wherein one barrier is provided at the bottom of said underground housing and around one or more points where a pipe or cable enters or exits said underground housing.

13. The system according to claim 9, wherein said animal is one or more of a mole, a shrew, a gopher, a prairie dog, a fox, a rabbit, a muskrat, a weasel, a skunk, a badger, a platypus, a bilbie, a meerkat, an owl, a frog, a spider, a rat, a mouse or an earthworm.

14. The system according to claim 9, wherein said barrier is impermeable to said ground dirt or other debris.

15. The system according to claim 9, wherein said barrier is impermeable to water.

16. The system according to claim 9, wherein said barrier further prevents roots from reducing the effectiveness of said underground housing.

\* \* \* \* \*